Patented Apr. 23, 1940

2,198,204

UNITED STATES PATENT OFFICE 2,198,204

STABILIZING FOOD COMPOSITIONS

Sidney Musher, New York, N. Y., assignor to Musher Foundation Incorporated, New York, N. Y., a corporation of New York No Drawing. Application September 13, 1939,
Serial No. 294,633

5 Claims. (Cl. 99—163)

The present invention relates to the preparation of new antioxygenic materials from readily available sources and having pronounced antioxygenic activity.

It is a purpose of the present invention to provide new antioxygenic materials that may be obtainable at low cost and with high potency for treatment particularly of aqueous or water containing food compositions and more particularly of the oil containing aqueous food compositions in which the oil is present in the discontinuous phase and the water present in the continuous phase.

Still further objects and advantages will appear from the more detailed description set forth below, it being understood, however, that this more detailed description is given by way of illustration and explanation only, and not by way of limitation, since various changes therein may be made by those skilled in the art without departing from the scope and spirit of the present invention.

In accomplishing the above objects, it has been found that the slightly acidified water soluble extracts of de-oiled soya and peanut flours, desirably in unbleached and finely divided condition, these flours being in the class of the legumes and the extracts being in liquid or dried condition, or adsorbed or absorbed upon carriers such as sugar, salt, etc., may be added in small quantities or under 5% to oxidizable organic compositions and particularly to aqueous food compositions subject to oxidization in order to retard oxidative deterioration thereof.

The de-oiling of the soya containing approximately 20% oil and of the peanut containing over about 35% oil is accomplished either by expression of a large portion of the glyceride oil contained therein or by extraction with oil soluble solvents such as with hexane or gasoline, for example, and the glyceride oil content is thereby reduced to about 10% or less.

The soya bean may, where desired, be decorticated before expression or extraction and, during the expression or extraction period, is desirably subjected to a temperature of over 50° C. to 60° C. in order to remove or inactivate objectionable enzymes contained in the soya.

The peanut may be de-hulled or degerminated before expression or extraction. The peanut germ may also be employed for water extraction following expression of its oil to under about 10%.

The de-oiled peanut and soya residues are then preferably finely divided so as to enable the water extraction to proceed more readily.

The de-oiled legume flour may be mixed or agitated thoroughly with a quantity of water for from 10 seconds to 1 hour or more. The water used should be substantially free of minerals and desirably free of iron and copper.

Any quantity of water may be used to produce a free flowing mixture. For example, one part of de-oiled soya flour may be mixed with 9 parts of water by weight. Other proportions may also be used such as from 5 to 25 parts of water to every 1 part of the soya flour. The soya-water suspension should then be subjected to thorough agitation, preferably for a period of about 30 minutes and at a slightly elevated temperature.

It is desirable for the temperature of the water at the time of extraction to be about 135° F. although room temperature is also satisfactory.

After a 30 minute agitation period, for example, the solution may be cooled where desired and the water soluble portion may be removed by filtration, centrifuging, siphoning or similar means. Where desired, the agitated mixture may be allowed to settle for from 2 to 12 hours or more until a clear supernatant liquid is formed which liquid is removed by decanting or siphoning.

The water used for extraction is desirably acidified to a pH of between about 4.5 and 6.7 and preferably to a pH of about 6 before subjecting to the extracting operation in order to obtain the maximum yield and the most potent antioxidant effects in the extracted material.

Where a higher proportion of total solids in the water is desired, a lesser amount of water may be used against the weight of the de-oiled soya or peanut flour, or, where desired, the water containing the extracted material may be employed for a second extraction with an additional quantity of de-oiled flour until the desired amount of total solids is present in the water.

The clear solution thus obtained should desirably be evaporated by vacuum distillation at not over about 135° F. under 25 inches of vacuum to approximately 25% to 75% total solids and desirably to about 70% solids and to a Baumé of 37°.

The evaporating temperature may vary, dependent upon whether vacuum or atmospheric pressure is used. Although it is desirable to use vacuum evaporation, evaporation at atmospheric pressure may also be employed. Preferably, the extract is sterilized in the vacuum pan by heating to about 80° C. to 90° C. for from 5 to 10 minutes in order to be sure that enzymatic action will no longer occur.

The water extract thus obtained will vary in appearance from a dark yellow to dark brown product and contains water soluble carbohydrate material as well as a complex of organic materials including water soluble phosphorous and nitrogen compounds, all of which are essential in producing the desired antioxygenic effect. Both the glyceride oils and glyceride oil soluble materials such as lecithin are substantially left behind in the residues.

The water soluble extract of de-oiled soya and peanut flours thus obtained, and particularly using an acidified water for the extraction procedure, with the water substantially removed by vacuum distillation, may be added in relatively small quantities such as in amounts of less than 5% and desirably less than 2% to food compositions subject to oxidation in order to retard oxidation thereof as well as to other organic oxidizable compositions, and particularly to glyceride oil containing compositions.

As little as 0.1% to 0.5% will usually give the desired antioxygenic effect dependent upon the oxidizable character of the composition that is to be treated.

For example, the water soluble extract of de-oiled soya or peanut flour may be added in a small proportion to dairy compositions and particularly to the aqueous phase of dairy products such as to the aqueous phase of milk, cream, ice cream, cream to be used in the manufacture of butter, cream cheese, evaporated milk, condensed milk, milk for powdering, etc. Even though the butterfat is present in the discontinuous phase of the butterfat emulsion and the water extract is present in the aqueous continuous phase and is not dissolved in the oxidizable fat phase, nevertheless the discontinuous fat phase is substantially protected against oxidative deterioration.

The water extract may much less desirably be utilized to retard oxidative deterioration of the straight glyceride oils such as the animal and vegetable fats and oils including lard, tallow, cod liver oil, herring oil, sardine oil, cottonseed oil, corn oil, soya bean oil, etc., whether in crude or refined condition or to be subsequently used for soap making, and including also mineral oil.

The water extract is, however, much more effective when added to the aqueous phase of an emulsion in which such oils are present. In other words, in the preparation of a cod liver oil emulsion, it is desirable to add the extract to the aqueous phase of the emulsion rather than to the cod liver oil itself.

The water extract may desirably be used for addition to a wide number of food compositions and particularly aqueous food compositions including beverages, such as orange and lemon and other citrus fruit drinks, ginger ale, cola drinks, essential oil food compositions, desserts, meat products including sausage, in the manufacture of canned soups and for use in other oil containing food compositions that are subject to the development of oxidized flavors and to deterioration as a result of oxidation.

The extract may be used in curing operations including the curing of fish, meat, vegetables and fruit such as in the curing of herring, bacon, hams, mackerel, sardines, olives, apples, etc.

The extract may also desirably be applied in a minor proportion to the cereal grains, such as to oatmeal, corn meal, whole wheat biscuits, corn flakes and other oxidizable food compositions in order to retard oxidative deterioration thereof as well as to fortify such food compositions in nutritive and other values.

Where it is desired that the water soluble extract of the de-oiled legume flour be dried, the extract may be applied to a drum or roller for drying but this is not considered desirable in view of the fact that the water extract may become burnt on the surface of the roll.

Where a dried product is desirable, it is preferable to apply the extract to a carrier and to be dried together with that carrier. Among the most desirable carriers are sugar and salt but other carriers include powdered skim milk, starch, lime, calcium phosphate, bone black, cereal and seed flours such as oat flour, wheat flour, rye flour, soya flour, etc.

The concentrated water extract is desirably applied to the carrier such as to salt or sugar in an amount ranging from 0.5% to 5% of the extract to from 99.5% to 95% of the carrier such as of salt or sugar. Other proportions may be used down to 50% of the extract to 50% of the carrier, although preferably a much larger proportion of the carrier is employed against the weight of the extract, particularly where the carrier containing the extract is being added to oxidizable food compositions in whole or in part replacement for the carrier which would normally be employed itself.

Where salt is used as a carrier, the extract may desirably be added to salt as it leaves the salt kiln and at a temperature of about 275° F. whereby the water remaining in the extract will be removed with the drying of the salt.

This extract may also be sprayed upon the salt in order to obtain complete absorption on the salt crystals while those crystals are at a temperature of about 180° F. and desirably at between 250° F. to 300° F. so that the extract dries on the surface of the crystals of the salt.

The desired amount of the water extract may also be applied to the salt crystals and absorbed on the surface of the salt crystals at lower temperatures and then the salt containg the extract may be subjected to an elevated temperature such as to over 180° F. either at atmospheric pressure or under reduced pressure until substantially all of the moisture originally contained in the extract has been evaporated off.

Where the extract is first substantially dried to dryness, the subsequent drying out procedures are not necessary, but it is considered desirable in order to obtain complete absorption of the extract on the surface of the salt crystals for the salt to be subjected to a drying operation and for the extract that is applied to the salt to be applied in substantially moistened condition.

The amount of de-oiled soya or peanut water extract to be applied to the salt will depend largely upon the degree of stabilizing activity desired and also upon whether or not a uniform crystalline structure is desired in the preparation of the salt and dependent upon the use to which the salt is to be put.

Where sugar is employed as the carrier, the extract may be added to the sugar crystals at the centrifugals in order to obtain complete surface coverage on the individual crystals of the sugar and to uniformly coat those crystals with the extract.

The sugar containing the extract may be run through the centrifugals until the balance of the water has been removed from the extract and the sugar containing the extract, present in approximately the same amounts as indicated in connection with salt, may be utilized as an antioxygenic sugar for retarding oxidative deterioration particularly of aqueous food compositions.

Salt or sugar as prepared in this manner will be markedly antioxygenic in character as compared with ordinary salt or sugar and even as compared with the extracts themselves. When utilizing these combinations, there is obtained a marked enhancement in stabilizing activity which cannot be expected from the stabilizing activity of any of the individual component parts of this mixture. It is not known whether an actual chemical combination takes place or whether it is merely an absorptive phenomenon which occurs at the surface of the salt or sugar crystals or whether there is an interaction of a catalytic nature which results in the marked enhancement of stabilizing and antioxygenic activity.

Although these extracts are not as effective when used with pure oils and fats such as with the essential oils, glyceride oils and hydrocarbon oils, they are extremely effective when used in aqueous materials and aqueous compositions which may contain oil globules in the discontinuous phase thereof. Under these circumstances there is obtained extremely marked protection to the oil or fat phase even though the water extract is added to the aqueous phase.

The salt-extract combination may therefore be very desirably utilized in brining and curing operations and particularly in the brining and curing of meat products, such as bacon, hams, pork, mutton, fat backs, etc., fishery products such as mackerel, sardines, salmon, tuna fish, fish livers, etc., fruits such as apples, peaches, pineapples, pears, olives, etc., and similar food compositions.

For such brining and curing operations, the salt-extract combination may be used in any desired proportion such as in an amount of from 2% of the combination to a fully concentrated solution in the water to be used in the brining operation.

Where the salt-extract combination is not dissolved in water but is used in dry form for the curing or brining treatments, it may be employed in an amount ranging from 0.05% to 50% against the weight of the food composition which is to be protected against oxidative deterioration. Generally, for curing and brining treatments, as little as 15% or less of the salt-water extract combination against the total weight of the fish, meat, or similar food composition will be sufficient to give desired antioxygenic protection.

When the salt-water extract combination is utilized in such brining operations, it is not only more effective than the ordinary untreated salt, but is, in addition, more effective than the original de-oiled legume flour from which the extract is removed.

In the case of salt or cured fishery and meat products such as salt mackerel, salt herring, cured bacon, etc., the product may be held for a first curing period of up to 30 days in a brine or curing mixture containing the water extract and then completely repacked by washing off or otherwise removing all of the stabilizing salt-water extract material, and the protective effect will nevertheless be retained over the entire storage period. Repacking in fresh salt or brine may, where desired, not be resorted to and the efficiency of the extract will in full be retained to a far greater degree than if the original unextracted flour had been employed with salt instead of the extract.

Where sugar is used as the carrier, the sugar containing the water extract may be employed in partial or complete replacement for ordinary sugar used in the manufacture of ice cream, sherbets, ices, beverages, jams, jellies, desserts, candies and confections and other food compositions normally containing sugar, whereby marked retardation of oxidation will be obtained.

Even the cereal grains themselves such as oatmeal, corn meal, corn flakes, wheat flakes, toasted whole wheat biscuits and other prepared cereals may be substantially protected against oxidative deterioration and their original vitamin content may be substantially retained and enhanced by adding thereto small amounts such as from 0.05% to 5% by weight of the de-oiled legume flour extracts referred to herein.

Where desired, the extract may be added to the cereal before the final processing such as before any final roasting or drying out operation and thoroughly admixed therewith. It is desirable for the extract to be thoroughly admixed with the cereal or cereal flour with which it is used in order to retard oxidative deterioration thereof.

The water extract may also be added to a cereal such as oatmeal, for example, by spraying the undried extract on the cereal and then drying, whereby each individual particle of the cereal is contacted with and carries the legume extract.

The extracts of de-oiled soya and peanut flours employed in this manner may be utilized without substantially changing the normal characteristics or appearance or flavor of the food compositions with which they are used although marked protection against oxidative deterioration is obtained. The development of oxidized flavors in milk or cream may, for example, be substantially retarded by adding thereto from 0.03% to 0.4% by weight of the concentrated water extract of de-oiled soya flour as indicated from the following experiment.

Milk that was susceptible to the development of oxidized flavors was treated in the following manners:

A. Untreated.

B. There was added to the milk 0.1% by weight of the concentrated water extract of soya flour which had been de-oiled by expeller expression to about 9% glyceride oil content. This concentrated water extract was prepared by extracting 1 part of the soya flour by weight with 7 parts by weight of water adjusted in acidity to a pH of 6.0, the extraction having been conducted at 135° F. for 30 minutes, at the end of which time the water soluble portion was removed by filtration and the water evaporated in a stainless steel vacuum pan at a temperature of 135° F. and under 25 inches of vacuum to an extract having 48% total solids.

The milks were examined for oxidized flavor, the number of plus signs indicating the degree of oxidized flavor.

|  | Oxidized flavor after— | | |
| --- | --- | --- | --- |
|  | 24 hours | 48 hours | 72 hours |
| Milk A | − | ++ | +++ |
| Milk B | − | + | ++ |

It is not desirable for the de-oiled soya or peanut flour before extraction to have been subjected to any boiling, fermentation, malting, sprouting, peptizing, causticizing or dextrinizing operations.

The water soluble extracts are substantially free of fibrous materials and contain water soluble sugars and carbohydrates which appear to be necessary to produce the desired antioxygenic effect.

These extracts possess the unusual property of having their antioxygenic activity materially increased by being subjected to an elevated temperature at the time of use in connection with the material requiring stabilization. Where, for example, the concentrated water soluble extract of the de-oiled flour is added to the food composition and then subjected to a temperature of in excess of 150° F. and desirably to in excess of 215° F., a marked increase in stabilizing effect is observed even though it is normally to be expected that a decrease in stabilizing action would be obtained.

It is not desirable, nor is the desired effect obtained, to heat the concentrated extract itself and then add such heated extract to the oxidizable food composition. When the extract is heated alone, substantially no improvement is obtained over the unheated extract and frequently a reduction in antioxygenic activity is observed.

Under these conditions the extract may be added to a food composition, such as to milk, cream or other diary product, to meat products, citrus fruit juices, beverages, desserts, candies, bakery goods, etc., and then those products subjected to an elevated temperature in order for the antioxygenic effect to be materially enhanced.

The residues obtained following the extraction may be utilized for ordinary animal feed purposes. For example, following the extraction of de-oiled soya or peanut flour, the residue may be substantially dried to remove all the excess solvent and such residues may be utilized in ordinary animal feeding compositions in view of the fact that they still contain good feed value.

The water soluble extract may also be added to oxidizable animal feed compositions and particularly to those containing oxidizable oils such as cod liver oil, herring oil, fish meals, etc., in order to retard oxidative deterioration thereof as well as to increase their nutritive and other properties. These extracts may also be added to cereal grasses and forage legumes in order to retard their loss of vitamin A during subsequent storage.

This application is a continuation in part of co-pending application Serial No. 135,169, filed April 5, 1937.

Having described my invention, what I claim is:

1. A process of retarding oxidative deterioration in glyceride oil containing food compositions which comprises extracting de-oiled soya with slightly acidified water, adding a small amount of said extract to the food composition and then heating to a temperature in excess of 250° F.

2. A process of retarding oxidative deterioration in glyceride oil containing food compositions which comprises extracting de-oiled legumes selected from the group consisting of soya and peanuts with slightly acidified water, adding a small amount of said extract to the food composition and then heating to in excess of 145° F.

3. A process of retarding oxidative deterioration in glyceride oil containing food compositions which comprises extracting a finely divided unbleached legume selected from the group consisting of soya and peanuts with slightly acidified water, adding a small amount of said extract to the glyceride oil containing food composition, and then heating to in excess of 145° F., whereby the food composition is substantially stabilized against oxidative deterioration.

4. A process of retarding oxidative deterioration in glyceride oil containing food compositions which comprises extracting a finely divided legume selected from the group consisting of soya and peanuts with water, concentrating said extract, adding a small amount of said extract to the glyceride oil containing food composition, and then heating to in excess of 145° F., whereby the food composition is substantially stabilized against oxidative deterioration.

5. A process of retarding oxidative deterioration in glyceride oil containing food compositions which comprises extracting de-oiled legumes selected from the group consisting of soya and peanuts with slightly acidified water, concentrating said extract, adding a small amount of said extract to the food composition, and then heating to in excess of 145° F., whereby the food composition is substantially stabilized against oxidative deterioration.

SIDNEY MUSHER.